United States Patent
Demers-Carpentier et al.

(10) Patent No.: US 11,428,668 B2
(45) Date of Patent: Aug. 30, 2022

(54) PROBE FOR EDDY CURRENT NON-DESTRUCTIVE TESTING

(71) Applicant: EDDYFI NDT INC., Quèbec (CA)

(72) Inventors: Vincent Demers-Carpentier, Quèbec (CA); Marco Michèle Sisto, Quèbec (CA)

(73) Assignee: EDDYFI CANADA INC., Quèbec (CA)

(*) Notice: Subject to any disclaimer, the term of this patent is extended or adjusted under 35 U.S.C. 154(b) by 0 days.

(21) Appl. No.: 16/967,708

(22) PCT Filed: Feb. 8, 2019

(86) PCT No.: PCT/IB2019/051042
§ 371 (c)(1),
(2) Date: Aug. 5, 2020

(87) PCT Pub. No.: WO2019/155424
PCT Pub. Date: Aug. 15, 2019

(65) Prior Publication Data
US 2021/0033565 A1 Feb. 4, 2021

Related U.S. Application Data

(60) Provisional application No. 62/627,903, filed on Feb. 8, 2018.

(51) Int. Cl.
*G01N 27/90* (2021.01)
(52) U.S. Cl.
CPC ................. *G01N 27/9006* (2013.01)
(58) Field of Classification Search
CPC ............ G01R 15/207; G01N 27/9006
See application file for complete search history.

(56) References Cited

U.S. PATENT DOCUMENTS

| 3,611,120 A | 10/1971 | Forster |
| 5,446,382 A * | 8/1995 | Flora .................. G01N 27/902 |
| | | 324/232 |

(Continued)

FOREIGN PATENT DOCUMENTS

| CA | 2633271 | 6/2007 |
| CA | 2807917 | 9/2013 |
| JP | 2017090185 | 5/2017 |

OTHER PUBLICATIONS

International Search Report for PCT App. No. PCT/IB2019/051042, dated May 24, 2019, 3 pp.

(Continued)

*Primary Examiner* — Noam Reisner
(74) *Attorney, Agent, or Firm* — Dawn-Marie Bey; Bey & Cotropia PLLC (57) ABSTRACT

There is described an Eddy current probe for non-destructive testing, comprising: a first leg extending along a first longitudinal axis between a first proximal end and a first distal end; a second leg extending along a second longitudinal axis between a second proximal end and a second distal end; a high magnetic permeability body extending at least partially between the first and second longitudinal axes, the high magnetic permeability body being spaced apart from the first and second legs by a gap and the high magnetic permeability body and the first and second legs being each made of a high magnetic permeability material; and at least one excitation coil each secured to at least one of the first leg and the second leg.

16 Claims, 7 Drawing Sheets

(56) References Cited

U.S. PATENT DOCUMENTS

| | | | |
|---|---|---|---|
| 5,623,204 A | 4/1997 | Wilkerson | |
| 6,265,870 B1 | 7/2001 | Weischedel | |
| 8,947,079 B2 * | 2/2015 | Yamamoto | G01N 27/9046 |
| | | | 324/240 |
| 2012/0206151 A1 | 8/2012 | Leonov | |
| 2017/0081955 A1 * | 3/2017 | Yu | G01V 3/28 |

OTHER PUBLICATIONS

Written Opinion for PCT App. No. PCT/IB2019/051042, dated May 24, 2019, 5 pp.
Supplementary European Search Report for Application No. EP 19 75 1257, dated Oct. 18, 2021, 8 pp.

* cited by examiner

PROBE FOR EDDY CURRENT NON-DESTRUCTIVE TESTING

TECHNICAL FIELD

The present invention relates to the field of non-destructive testing, and more particularly to a probe for Eddy current non-destructive testing.

BACKGROUND

Non-destructive testing (NDT) is a discipline which aims to evaluate the integrity and/or physical properties of materials without permanently altering the object being inspected. There are numerous NDT methods, tailored to various material, component and defect types. Electromagnetic NDT methods involve the generation of Eddy currents (EC) into a conductive component to measure variation in mechanical properties or the presence of cracks and defects.

Figure 1:
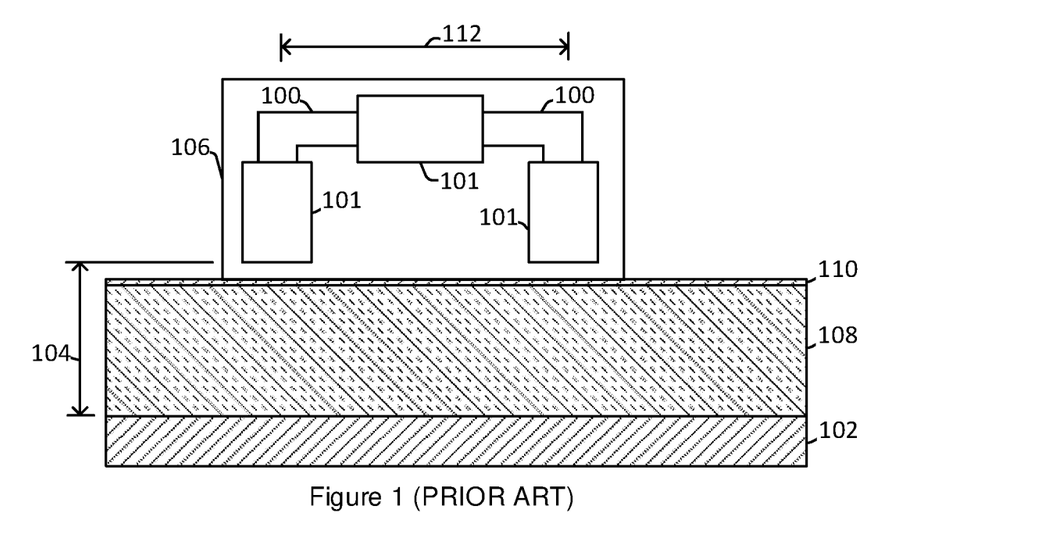
FIG. 1 illustrates an Eddy current probe according to the prior art.

Probes used for these EC methods typically include an excitation coil, which is used to induce a time-variable magnetic field in a conductive object under test and generate the Eddy currents. Magnetic sensing devices such as coils, Hall effect detectors, giant magneto resistor (GMR) or the like are then used to measure the response magnetic field, emitted as a result of the Eddy currents. Among the possible shapes of the excitation coil, the yoke probe design illustrated in FIG. 1, is well known to provide a relatively strong magnetic field in a conductive object 102 being inspected. The prior art yoke probe of FIG. 1 usually comprises a casing 106 in which a U-shaped coil core 100 and three coils 101 mounted on the U-shaped coil core 100. The magnetic reluctance of the U-shaped coil core 100 is minimized to improve the amplitude of the generated magnetic field. Hence, the U-shaped coil core 100 is usually be made of a single piece of magnetic permeable material. The total magnetic reluctance of the magnetic circuit composed by the yoke excitation coil and the conductive object 102 being inspected is minimized by the high magnetic permeability of the coil core, thus greatly improving the intensity of the excitation magnetic field generated in the object. Everything else being equal, a larger intensity of the emitted magnetic field induces a stronger Eddy current response in the tested object, ultimately increasing the signal-to-noise ratio (SNR) of the Eddy current inspection method.

A second advantageous feature of the yoke excitation coil design is that it generates a field that is well directed toward the object under test. This directionality is another effect of the presence of a U-shaped coil core 100. The directionality of the field ensures that the probe is sensitive to the object placed in front of the legs of the U-shaped coil core 100, but relatively insensitive to any other ferromagnetic object placed on the opposite side of the probe.

While intensity and directionality of the excitation field list among the main advantages of the yoke design, it suffers from a relatively large magnetic footprint of the probe on the object being inspected. The probe magnetic footprint can be defined as the area of the tested object that receives a magnetic field with intensity exceeding a given threshold level. The size of the magnetic footprint is directly related to the maximal spatial resolution attainable by a probe. In practical implementations of the yoke design, the magnetic footprint is essentially determined by the distance between the legs of the U-shaped coil core 100 and by the probe lift-off 104, i.e. the distance between the bottom of the coils 101 and the conductive object 102 being inspected. The lift-off 104 is often due to the presence of an insulation layer 108 and a weather jacket or cladding 110 installed on the surface of the object to be inspected. The leg spacing 112, i.e. the distance between the legs of the U-shaped coil core 100, determines the maximum lift-off supported by the probe. For a given leg spacing 112, the maximum supported lift-off is the probe-object distance where most of the emitted excitation field folds back into the yoke without reaching the object under test, so that the SNR of the Eddy current inspection method falls below a given threshold. The maximum supported lift-off can be increased in various ways, all aiming to improve the SNR. Notably, the maximum supported lift-off is improved by enlarging the legs spacing 112, but this also increases the magnetic footprint. So, the challenge is to minimize the magnetic footprint without compromising the maximum supported lift-off or the SNR.

Practical implementations of probes for Eddy current systems include a mean to sense the magnetic response of the object under test upon exposition to the excitation field generated by the excitation coil. Some implementations are based on sensing coils, either coaxial or non-coaxial with the excitation coil. A desired feature of the probe design is to combine large sensitivity to the magnetic response of the tested object combined with low sensitivity to magnetic noise from external sources like nearby electric motors, cables or machinery. Prior art probe designs employing the yoke configuration and coaxial excitation and sensing coils can take advantage of the high permeability coil core to provide large sensitivity to the magnetic response of the tested object. However, it has been observed that such a configuration can also pick up external magnetic noise, compromising the SNR of the Eddy current inspection method.

Therefore, there is a need for an improved Eddy current probe.

SUMMARY

According to a first broad aspect, there is provided an Eddy current probe for non-destructive testing, comprising: a first leg extending along a first longitudinal axis between a first proximal end and a first distal end; a second leg extending along a second longitudinal axis between a second proximal end and a second distal end; a high magnetic permeability body extending at least partially between the first and second longitudinal axes, the high magnetic permeability body being spaced apart from the first and second legs by a gap and the high magnetic permeability body and the first and second legs being each made of a high magnetic permeability material; and at least one excitation coil each secured to at least one of the first leg and the second leg.

In one embodiment, the high magnetic permeability body faces the first distal end of the first leg and the second distal end of the second leg and a length of the high magnetic permeability body is at least equal to a distance between the first and second legs.

In one embodiment, the first and second longitudinal axes are parallel.

In one embodiment, a longitudinal axis of the high magnetic permeability body is substantially orthogonal to the first and second longitudinal axes.

In one embodiment, at least one of the first leg, the second leg and the high magnetic permeability body has a circular cross-sectional shape.

In one embodiment, at least one of the first leg, the second leg and the high magnetic permeability body has a tubular shape.

In one embodiment, the high magnetic permeability body is curved.

In one embodiment, a length of the at least one excitation coil is longer than a length of the at least one of the first leg and the second leg.

In another embodiment, a length of the at least one excitation coil is substantially equal to a length of the at least one of the first leg and the second leg.

In one embodiment, the Eddy current probe further comprises a casing made of an electrically non-conductive material, the first and second legs, the high magnetic permeability body and the at least one excitation coil being contained within the casing.

In one embodiment, the first and second legs and the high magnetic permeability body are secured to the casing via a connection body.

In one embodiment, the first and second legs are secured to the high magnetic permeability body via a connection body made of a non-conductive and non-magnetically permeable material.

In one embodiment, the Eddy current probe further comprises at least one magnetic field sensor.

In one embodiment, a center of mass of each one of the at least one magnetic field sensor is located between a center of mass of a respective one of the at least one excitation coil and a proximal end of the respective one of the at least one excitation coil.

In one embodiment, each one of the at least one magnetic field sensor is adjacent to the proximal end of the respective one of the at least one excitation coil.

In one embodiment, the at least one magnetic field sensor comprises at least one sensing coil.

In one embodiment, each one of the at least one sensing coil is wound around a respective one of the at least one excitation coil.

In one embodiment, a center of mass of each one of the at least one sensing coil is located between a center of mass of the respective one of the at least one excitation coil and a proximal end of the respective one of the at least one excitation coil.

In one embodiment, each one of the at least one sensing coil is adjacent to the proximal end of the respective one of the at least one excitation coil.

In one embodiment, the at least one sensing coil comprises a first sensing coil and a second sensing coil each around a same one of the at least one excitation coil.

In one embodiment, a center of mass of the first sensing coil is located between a center of mass of the same one of the at least one excitation coil and a first end thereof and a center of mass of the second sensing coil is located between the center of mass of the same one of the at least one excitation coil and a second end thereof.

In one embodiment, the first sensing coil is positioned adjacent to the first end of the same one of the at least one excitation coil and the second sensing coil is positioned adjacent to the second end of the same one of the at least one excitation coil.

In one embodiment, the first sensing coil and the second sensing coil are spaced apart.

In one embodiment, the magnetic field sensor comprises one of a Giant Magneto-Resistor, a Tunneling Magneto-Resistor and a Hall effect sensor.

In one embodiment, the at least one excitation coil comprises a first excitation coil secured to the first leg and a second excitation coil secured to the second leg.

According to another broad aspect, there is provided an Eddy current probe for non-destructive testing, comprising: a first leg extending along a first longitudinal axis between a first proximal end and a first distal end; a second leg extending along a second longitudinal axis between a second proximal end and a second distal end; a high magnetic permeability body extending at least partially between the first and second longitudinal axes, the high magnetic permeability body being spaced apart from the first and second legs by a gap and the high magnetic permeability body and the first and second legs being each made of a high magnetic permeability material; and a first excitation coil wound around the first leg, the first excitation coil extending between a first front end and a first back end adjacent to the high magnetic permeability body; a second excitation coil wound around the second leg, the second excitation coil extending between a second front end and a second back end adjacent to the high magnetic permeability body; a first sensing coil wound around the first excitation coil, a center of mass of the first sensing coil being located between a center of mass of the first excitation coil and the first front end of the first excitation coil; and a second sensing coil wound around the second excitation coil, a center of mass of the second sensing coil being located between a center of mass of the second excitation coil and the second front end of the second excitation coil.

In one embodiment, the first sensing coil is adjacent to the first front end of the first excitation coil and the second sensing coil is adjacent to the second front end of the second excitation coil.

In one embodiment, the Eddy current probe further comprises a first detection coil wound around the first excitation coil, a center of mass of the first detection coil being located between the center of mass of the first excitation coil and the first back end of the first excitation coil; and a second detection coil wound around the second excitation coil, a center of mass of the second detection coil being located between the center of mass of the second excitation coil and the second back end of the second excitation coil.

In one embodiment, the first detection coil is located adjacent to the first back end of the first excitation coil and the second detection coil is located adjacent to the second back end of the second excitation coil.

In one embodiment, the first sensing coil and the first detection coil are spaced apart along the first longitudinal axis and the second sensing coil and the second detection coil are spaced apart along the second longitudinal axis.

In one embodiment, the high magnetic permeability body faces the first distal end of the first leg and the second distal end of the second leg and a length of the high magnetic permeability body is at least equal to a distance between the first and second legs.

In one embodiment, the first and second longitudinal axes are parallel.

In one embodiment, a longitudinal axis of the high magnetic permeability body is substantially orthogonal to the first and second longitudinal axes.

In one embodiment, at least one of the first leg, the second leg and the high magnetic permeability body has a circular cross-sectional shape.

In one embodiment, at least one of the first leg, the second leg and the high magnetic permeability body has a tubular shape.

In one embodiment, the high magnetic permeability body is curved.

In one embodiment, a length of the first excitation coil is greater than a length of the first leg and a length of the second excitation coil is greater than a length of the second leg.

In one embodiment, a length of the first excitation coil is substantially equal to a length of the first leg and a length of the second excitation coil is substantially equal to a length of the second leg.

In one embodiment, the Eddy current probe further comprises a casing made of an electrically non-conductive material, the first and second legs, the high magnetic permeability body, the first and second excitation coils and the first and second sensing coils being contained within the casing.

In one embodiment, the first and second legs and the high magnetic permeability body are secured to the casing via a connection body.

In one embodiment, the first and second legs are secured to the high magnetic permeability body via a connection body made of a non-conductive and non-magnetically permeable material.

In some embodiments, the probe disclosed below can be used in conjunction with NDT methods based on Eddy currents, including Pulsed Eddy current (PEC) or Transient Eddy current (TEC) methods and low frequency Eddy current (LOFEC) methods.

In one embodiment, the present Eddy current probe allows simultaneously improving the SNR and the magnetic footprint without sacrificing the maximum supported liftoff in comparison to a prior art yoke probe design.

In one embodiment, the present Eddy current probe allows reducing the probe magnetic footprint and the sensitivity to external noise in comparison to a prior art yoke probe design.

In one embodiment, the magnetic field sensor comprises at least two sensing coils, both coaxial and wound around one of the at least one excitation coil.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 2:
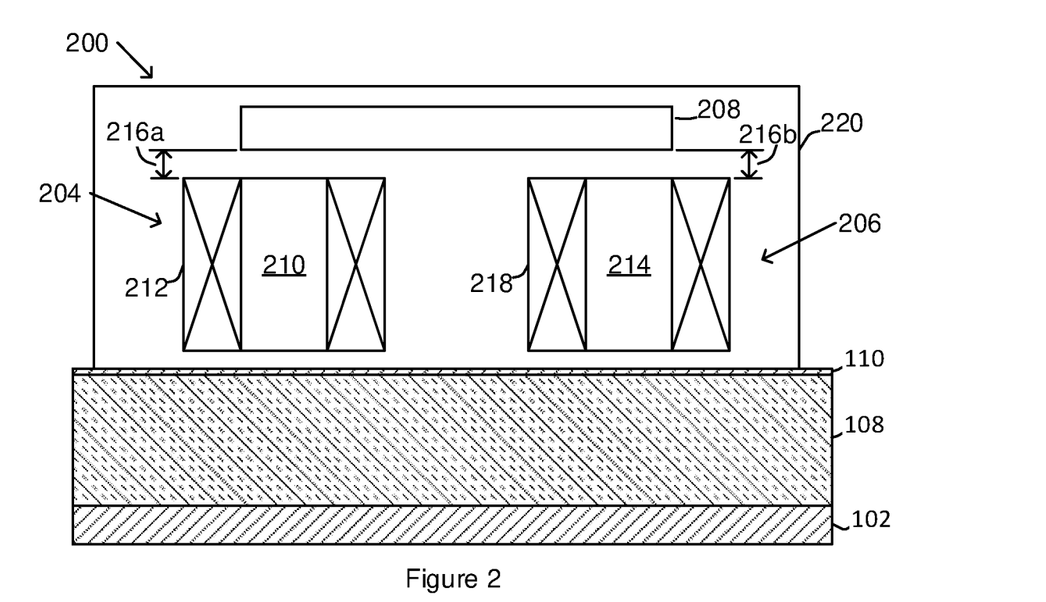
FIG. 2 schematically illustrates an Eddy current probe comprising two core legs around which a respective excitation coil is wound, and a high magnetic permeability body spaced apart from the two core legs and located above the two core legs, in accordance with an embodiment, FIG. 3 schematically illustrates an Eddy current probe comprising the components of the probe of FIG. 2, and further comprises two sensing coils, in accordance with an embodiment.

FIG. 2 illustrates one embodiment of an Eddy current probe 200 to be used for sensing the conductive object 102 to be inspected or any other adequate conductive object. For example, while the conductive object is provided with the insulation layer 108 and the weather jacket or cladding 110 installed thereon, it should be understood that the insulation layer 108 and/or the weather jacket or cladding 110 may be omitted.

The probe 200 comprises three main components assembled according to a substantially U-shape configuration, i.e. it comprises a first sensing unit 204, a second sensing unit 206 and a high magnetic permeability body 208. The first sensing unit 204 comprises a first core leg 210 and a first solenoid or coil 212 secured to the first core leg 210. The second sensing unit 206 comprises a second core leg 214 and a second solenoid or coil 218 secured to the second core leg 214.

The high magnetic permeability body 208 is made of high magnetic permeability material, i.e., a material having a relative permeability being greater than the surrounding medium. Examples of adequate high magnetic permeability materials comprise ferrite, a non-electrically conductive material with a relative magnetic permeability of 100 and more, and the like. Other materials such as laminated mild steel or iron and the like may also be used. Using an electrically conductive material for the high magnetic permeability body 208 may induce Eddy currents into the material, which may reduce the quality of the signal. In one embodiment, the person skilled in the art may select such an electrically conductive material to save cost or exploit much higher magnetic permeability for certain applications. The person skilled in the art may also select laminated electrically conductive material to reduce the undesired Eddy Current induced into the material.

Each core leg 210, 214 extends longitudinally between a proximal end positioned to face the conductive object 102 to be inspected and a distal end opposite to the proximal end. The high magnetic permeability body 208 is positioned so as to face the distal end of the core legs 210 and 214 while being spaced apart from the core legs 210 and 214. Since the high magnetic permeability body 208 is not in physical contact with the core legs 210 and 214, a first gap 216a exists between the distal end of the first core leg 210 and the high magnetic permeability body 208 and a second gap 216b also exists between the distal end of the second core leg 214 and the high magnetic permeability body 208. It should be understood that the gap may comprise air or any material or fluid having a magnetic permeability being less than that of the high magnetic permeability body 208.

In the illustrated embodiment, the first core leg 210 and the second core leg 214 are made of a high permeability material such as ferrite. In one embodiment, the first and second core legs 210 and 214 are made of the same material as that of the high magnetic permeability body 208. Also, in the illustrated embodiment, the longitudinal axes of the first and second core legs 210 and 214 are substantially parallel together. The longitudinal axis of the high magnetic permeability body 208 is substantially orthogonal to the longitudinal axes of the first and second core legs 210 and 214. However, it should be understood that other configurations may be possible. For example, the longitudinal axes of the core legs 210 and 214 may not be parallel together and the longitudinal axis of the high magnetic permeability body 208 may be orthogonal to only one of the longitudinal axes of the first and second core legs 210 and 214. In another example, the longitudinal axis of the high magnetic permeability body 208 may not be orthogonal to any of the longitudinal axes of the first and second core legs 210 and 214. In a further example, the high magnetic permeability body 208 may not be linear. For example, the high magnetic permeability body 208 may be curved as long as the gap 216a, 216b be present between the high magnetic permeability body 208 and the first and second core legs 210 and 214.

Still referring to FIG. 2, the first coil 212 is wound around the first core leg 210 while the second coil 218 is wound around the second core leg 214. While the length of the coil 212 is substantially equal to that of the first core leg 210 and the length of the second coil 218 is substantially equal to that of the second core leg 214, it should be understood that other configurations may be possible. For example, the length of the first and/or second leg core 210 and 214 may be greater than the length of the first and/or second coils 212 and 218, respectively. In another example, the length of the first and/or second core legs 210 and 214 may be shorter than the length of the first and/or second coils 212 and 218, respectively. In this case, the first and/or second coils 212 and 218 may be in physical contact with the high magnetic permeability body 208 as long as the first and second core legs 210 and 214 are spaced apart from the high magnetic permeability body 208 by a gap 216a, 216b so that there is no physical contact between the high magnetic permeability body 208 and the first and second core legs 212 and 218.

In one embodiment, the first core leg 210, the second core leg 214 and the high magnetic permeability body 208 each have a tubular shape. However, it should be understood that the first core leg 210, the second core leg 214 and/or the high magnetic permeability body 208 may have a cross-sectional shape other than circular such as a square shape, a rectangular shape, an octagonal shape, or the like. Similarly, while the first core leg 210, the second core leg 214 and the high magnetic permeability body 208 each extend along a straight longitudinal axis, other configurations may be possible. For example, the first core leg 210, the second core leg 214 and/or the high magnetic permeability body 208 may have a curved shape. In another example, the high magnetic permeability body 208 may have a U-shape with a first leg facing the core leg 210 with a first gap therebetween and a second leg facing the core leg 214 with a second therebetween.

While the first and second core legs 210 and 214 are identical in the illustrated embodiment, it should be understood that the first and second core legs 210 and 214 may have a different shape such as a different cross-section shape, different dimensions, and/or the like. In the same or another embodiment, the core legs 210 and 214 may be made of different high permeability materials. It should further be understood that the position of the first and second core legs 210 and 214 relative to the high magnetic permeability body 208 may be different. For example, the longitudinal axis of the first core leg 210 may be substantially orthogonal to that of the high magnetic permeability body 208 while the longitudinal axis of the second core leg 214 may not be orthogonal to that of the high magnetic permeability body 208. In another example, while in the illustrated embodiment the first gap 216a between the first core leg 210 and the high magnetic permeability body 208 and the second gap 216b between the second core leg 214 and the high magnetic permeability body 208 have the same length, the length of the gap 216a between the first core leg 210 and the high magnetic permeability body 208 may be different from that of the gap 216b between the second core leg 214 and the high magnetic permeability body 208.

In the illustrated embodiment, the length of the high magnetic permeability body 208 is greater than the distance between the central axis of the first core leg 210 and the central axis of the second core leg 214. However, it should be understood that other configurations may be possible as described below.

Similarly, while the two core legs 210 and 214 and the high magnetic permeability body 208 are positioned according to a substantially U-shape, the position of the high magnetic permeability body 208 relative to the first and second core legs 210 and 214 may also vary as long as there is no physical contact between the high magnetic permeability body 208 and the first and second core legs 210 and 214, as described below.

The first and second coils 212 and 218 are disposed according to a chiral configuration. i.e. when an excitation current is applied to the coils 212 and 218, the excitation current flows clockwise in one of the two coils 212 and 218 and counter-clockwise in the other coil 212, 218. As a result, the two coils 212 and 218 act as opposite magnetic poles of an electromagnet.

It should be understood that the number of excitation coils 212, 218 may vary as long as the probe 200 comprises at least one excitation coil wound around one of the two core legs 210 and 214. For example, the coil 218 may be omitted. In another example, the probe 200 may further comprise an excitation coil wound around the high magnetic permeability body 208. In one embodiment, an excitation coil wound around the high magnetic permeability body 208 may be used for increasing the intensity of the emitted magnetic field but may degrade the magnetic footprint while still improving the magnetic footprint in comparison to the prior art yoke design.

In one embodiment, the probe 200 further comprises a casing 220 in which the sensing units 204 and 206 and the high magnetic permeability body 208 are enclosed. The casing 220 is made of an electrically non-conductive material such as plastic. The first and second core legs 210 and 214 and the high magnetic permeability body 208 may each be secured to the casing 220 via bodies (not shown) made of non-electrically conductive material. The first and second core legs 210 and 214 may be positioned within the casing 220 so that the winding axes of the excitation coils 212 and 218 be substantially orthogonal to the surface of the conductive object 102 been inspected. For example, the given face of the casing 220 facing the distal ends of the first and second core legs 210 and 214 may be planar and the distal ends of the first and second core legs 210 and 214 may be coplanar and parallel to the given face of the casing 220. For example, the first and second core legs 210 and 214 may be orthogonal to the given face of the casing 220 to ensure that the longitudinal axes of the excitation coils 212 and 218 be orthogonal to the given face of the casing 220.

In the same or another embodiment, the probe may further comprise at least one connection body (not shown) for securing the high magnetic permeability body 208 to the first and second core legs 210 and 214. In this case, the connection body(ies) is(are) made of a non-conductive and non-magnetically permeable material. The connection body ensures that the high magnetic permeability body 208 be spaced apart from the first and second core legs 210 and 214 and the length of the gap 216a, 216b remain constant in time.

In one embodiment, the excitation coils 212 and 218 are electrically connectable to an electrical source such as a source of current or a source of voltage adapted to generate an electrical excitation that will flow into the excitation coils 212 and 218. When the probe 200 is used in a TEC or PEC method, the electrical source of current may be pulsed so that the pulsed excitation current generates a magnetic field that gradually penetrates the thickness of the conductive object 102 being inspected. Eddy currents are generated in the conductive object 102 being inspected and gradually fade away until a steady state condition is reached. The duration of the pulse is estimated from the nominal object thickness so that it is long enough to ensure that the steady state condition is reached. When the excitation pulse is shut off, Eddy currents are generated in the conductive object 102 been inspected and magnetic fields decays.

In one embodiment such as the probe 200, the excitation coils 212 and 218 may be used as magnetic sensor in a dual-purpose coil configuration to measure the magnetic field generated in the conductive object 102 to be inspected, as known in the art.

In another embodiment, the probe 200 may further comprise a magnetic sensor which may be implemented using Giant Magneto-Resistors, Tunneling Magneto-Resistors, Hall effect sensors or other similar magnetic sensors known in the art. In this case, the magnetic field generated in the conductive object 102 been inspected is detected by the further magnetic sensor.

Figure 3:
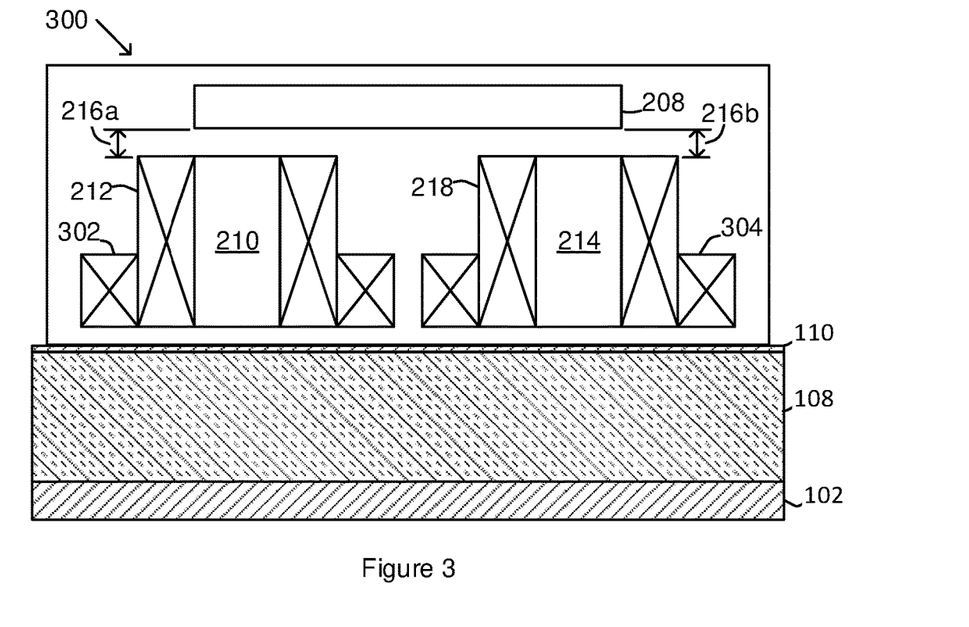

In a further embodiment, the probe 200 may comprise at least one additional coil to be used as a magnetic field sensor. An example of such a probe that comprises at least one sensing coil acting as a magnetic field sensor is illustrated in FIG. 3.

In one embodiment, the present probe 200 presents the following advantage over at least some prior art probes. The gap 216 between the high magnetic permeability body 208 and the first and second core legs 210 and 214 allows reducing the probe magnetic footprint by changing the distribution of magnetic field lines generated by the excitation coils 212 and 218 in comparison to prior art probes comprising a single-piece/gap-less U-shaped core yoke. Simulations show that the presence of a high magnetic permeability body 208 in physical contact with the core legs 210 and 214 causes the field lines from the excitation coils 212 and 218 to spread out over a larger area, while adding a gap 216a, 216b between the high magnetic permeability body 208 and the first and second core legs 210 and 214 reduces the spreading, thus effectively reducing the magnetic footprint of the probe 200 in comparison to prior art probes comprising a single piece/gap-less U-shaped core yoke.

In one embodiment, the gap 216a, 216b or spacing length, i.e. the distance between the distal ends of the first and second core legs 210 and 214 and the high magnetic permeability body 208, is chosen taking into account a desired amplitude for the generated magnetic field. Since increasing the spacing between the high magnetic permeability body 208 and the first and second core legs 210 and 214 increases the magnetic reluctance of the excitation coils 212 and 218, thereby decreasing the amplitude of the generated magnetic field, a tradeoff between a desired magnetic footprint for the probe 200 and a desired amplitude for the generated magnetic field is to be chosen.

In one embodiment, the high magnetic permeability body 208 positioned so as to be spaced apart from the first and second core legs 210 and 214 by the gap 216a, 216b allows screening the excitation coils 212 and 218 from external magnetic noise, thereby improving the SNR compared to probes in which the high magnetic permeability body would be in physical contact with core legs so as to form a yoke.

In one embodiment, the distance between the high magnetic permeability body 208 and the distal ends of the first and second core legs 210 and 214 is substantially equal to about 8 mm.

FIG. 3 illustrates one embodiment of an Eddy current probe 300 which comprises all of the elements of the probe 200 and further comprises two sensing coils 302 and 304. In the illustrated embodiment, the sensing coil 302 is wound around the external face of the excitation coil 212 so that the two coils 212 and 302 be concentric. The second sensing coil 304 is wound around the external face of the excitation coil 218 so that the coils 218 and 304 be concentric. It should be understood that the sensing coils 302 and 304 are used for detecting the magnetic field generated by the Eddy currents within the conductive object 102 under inspection.

It should be understood that the height or length of the sensing coils 302 and 304 along the longitudinal axis of the core legs 210 and 214, respectively, may vary. In one embodiment, the height or length of the sensing coils 302 and 304 along the longitudinal axis of the core legs 210 and 214, respectively, is less than that the excitation coils 212 and 214, respectively. For example, the height of the sensing coil 302, 304 may be 25% or 12.5% of that of the excitation coil 212, 218.

Similarly, while in the illustrated embodiment the sensing coils 302 and 304 are secured to the excitation coils 212 and 218, respectively, adjacent to the proximal end thereof, it should be understood that the position of the sensing coils 302 and 304 along the length of the excitation coils 212 and 218 may vary. In one embodiment, the sensing coil 302, 304 is positioned so that its center of mass be positioned along the longitudinal axis of the excitation coil 212, 218 between the center of mass of the excitation coil 212, 218 and the proximal end of the excitation coil 212, 218. While the proximal end of the sensing coil 302, 304 is coplanar with the proximal end of the excitation coil 212, 218, it should be understood that other configurations are possible. For example, the proximal end of the sensing coil 302, 304 may protrude from the plane that comprises the proximal end of the excitation coil 212, 218. It should also be understood that the sensing coils 302 and 304 may be positioned within the probe 300 so as to be spaced apart from the excitation coils 212 and 218.

In one embodiment, the probe 300 may further comprise a sensing coil wound around the high magnetic permeability body 208 to improve the sensitivity of the probe 300.

Figure 4:
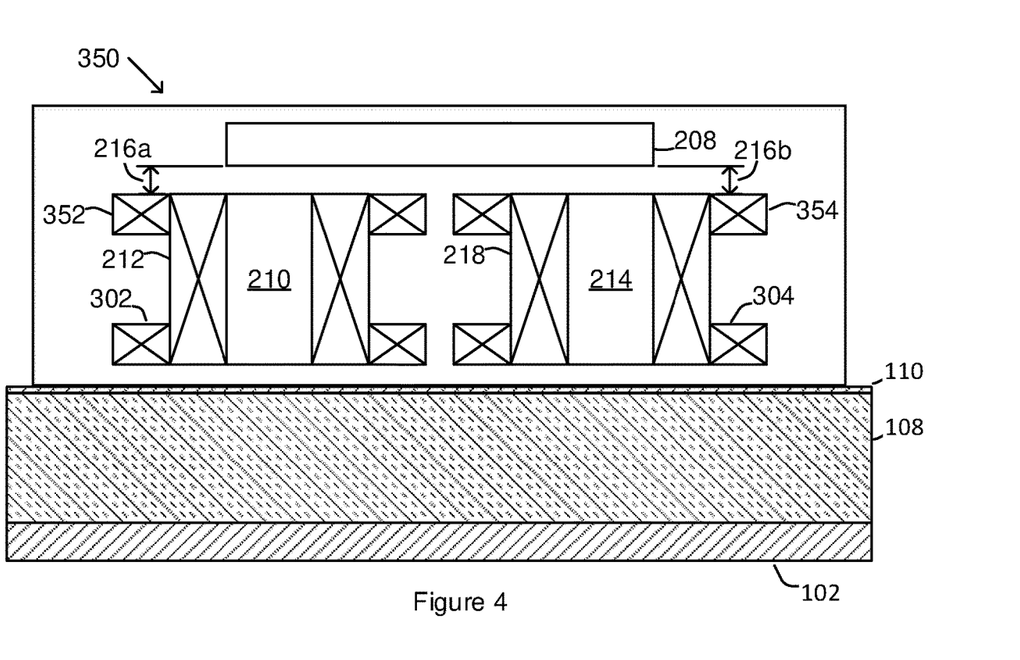
FIG. 4 schematically illustrates an Eddy current probe comprising the components of the probe of FIG. 3, and further comprises an additional sensing coil wound on each excitation coil, in accordance with an embodiment.

FIG. 4 illustrates one embodiment of an Eddy current probe 350 which comprises all of the elements of the probe 300 and further comprises two additional sensing coils 352 and 354. In the illustrated embodiment, the sensing coil 352 is wound around the external face of the excitation coil 212 so that the two coils 212 and 352 be concentric and the sensing coils 302 and 352 be coaxial. The sensing coil 354 is wound around the external face of the excitation coil 218 so that the coils 218 and 354 be concentric and the sensing coils 304 and 354 be coaxial.

The sensing coils 302 and 352 are spaced apart by a first distance along the longitudinal axis of the excitation coil 212 and the sensing coils 304 and 354 are spaced apart by a second distance along the longitudinal axis of the excitation coil 218. While in the illustrated embodiment, the first and second distances are equal, it should be understood that other configurations are possible.

In one embodiment, the first distance and/or the second distance is greater than zero so that the sensing coils 302 and 352 are not in physical contact along the excitation coil 212 and/or the sensing coils 304 and 354 are not in physical contact along the excitation coil 218.

In another embodiment, the first distance and/or the second distance may be equal to zero so that the sensing coils 302 and 352 are in physical contact together and/or the sensing coils 304 and 354 are in physical contact together.

In the illustrated embodiment, the sensing coil 302 is positioned adjacent to the proximal end of the excitation coil 212 while the sensing coil 352 is positioned adjacent to the distal end of the excitation coil 212. Similarly, the sensing coil 304 is positioned adjacent the proximal end of the excitation coil 218 while the sensing coil 354 is positioned adjacent to the distal end of the excitation coil 218.

Similarly to the sensing coils 302 and 304, it should be understood that the height or length of the sensing coils 352 and 354 along the longitudinal axis of the excitation coils 212 and 218, respectively, may vary. In one embodiment, the length of the sensing coil 352, 354 along the longitudinal axis of the excitation coil 212, 218 is less than that of the excitation coil 212, 218.

It should be understood that the position of the sensing coils 352 and 354 may along the length of the excitation coils 212 and 218, respectively. In one embodiment, the sensing coil 352 is positioned so that its center of mass be located between the center of mass of the excitation coil 212 and the distal end of the excitation coil 212, and the sensing coil 354 is positioned so that its center of mass be located between the center of mass of the excitation coil 218 and the distal end of the excitation coil 218.

While in the illustrated embodiment, the distal end of the sensing coil 352, 354 is coplanar with the distal end of the excitation coil 212, 218, it should be understood that other configurations are possible. For example, the distal end of the sensing coil 352, 354 may protrude from the plane that comprises the distal end of the excitation coil 212, 218.

In one embodiment, the height or length of the sensing coils 302 and 352 may correspond to about 12.5% of the height or length of the excitation coil 212 and the first distance between the sensing coils 302 and 352 may correspond to about 75% of the height or length of the excitation coil 212. Similarly, the height or length of the sensing coils 304 and 354 may correspond to about 12.5% of the height or length of the excitation coil 218 and the second distance between the sensing coils 304 and 354 may correspond to about 75% of the height or length of the excitation coil 218.

It should be understood that the length of the sensing coils 302, 304, 352 and 354 and their position along the length of the excitation coil 21, 218 are chosen so as to capture predefined magnetic field lines.

Figure 5:
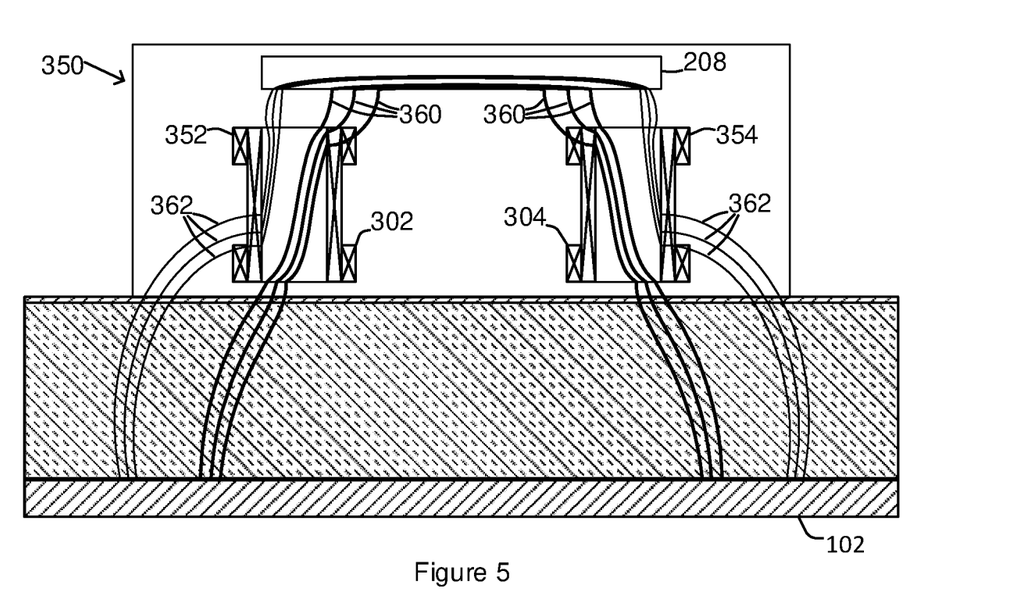
FIG. 5 illustrates the magnetic field lines generated by the conductive object under test when the probe of FIG. 4 is used, in accordance with an embodiment.

While they are all used for detecting the magnetic field generated by the Eddy currents within the conductive object 102, the sensing coils 302, 304, 352 and 354 do not detect identical magnetic fields from the conductive object 102 due to their different position along the axis orthogonal to the surface of the object 102, as illustrated in FIG. 5.

FIG. 5 illustrates a simulation of a possible configuration for magnetic field lines generated in the object 102 under inspection upon exposition to the excitation field generated by the excitation coils 212 and 218. As illustrated, some magnetic field lines 360 are equally captured by the sensing coils 302 and 304 as well as by the sensing coils 352 and 354. However, other magnetic field lines 362 are only captured by the sensing coils 352 and 354. As a result, the sensing coils 302 and 304 only capture magnetic field lines that originate near to the probe 350, such as magnetic field lines 360, effectively providing a reduced detection magnetic footprint compared to the prior art. Conversely, the sensing coils 352 and 354 capture magnetic field lines that originate farther away from the probe 350 such as magnetic field lines 362, effectively enlarging the detection magnetic footprint compared to the sensing coils 302 and 304. This difference may be exploited to improve the detection and sizing of defects in the conductive element 102. The relative position of the sensing coils 302 and 352 and that of the sensing coils 304 and 354, i.e. the distance between the sensing coils 302 and 352 along the longitudinal axis of the excitation coil 212 and the distance between the sensing coils 304 and 354 along the longitudinal axis of the excitation coil 218, can be optimized experimentally or by simulation in order to maximize the difference in the detected magnetic fields captured respectively by the sensing coils 302 and 304 and the sensing coils 352 and 354.

Figure 6:
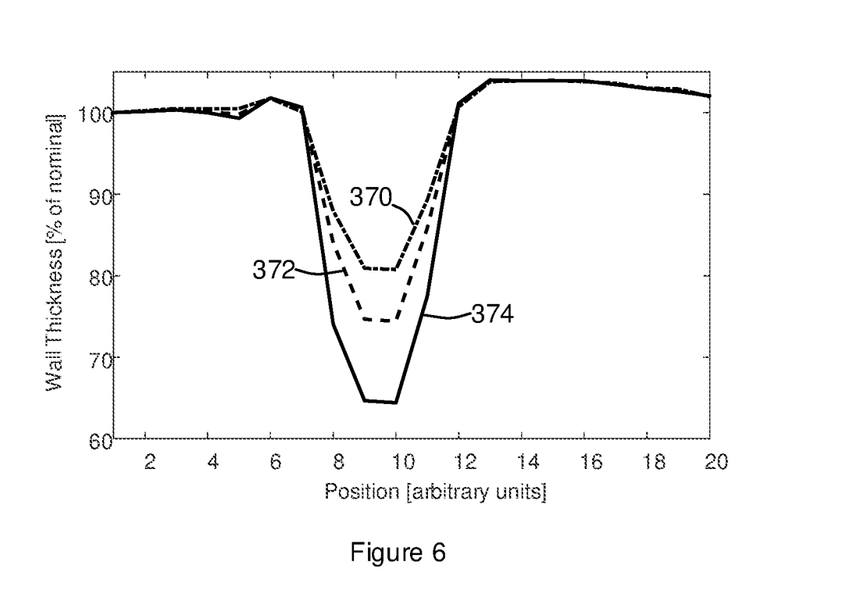
FIG. 6 is an exemplary graph illustrating the result of a wall thickness measurement on a conductive component with a localized defect when the probe of FIG. 4 is used.

FIG. 6 illustrates the experimental result of the determination of the thickness of a defect (i.e. a thinning) present in an object such as object 102 using the probe 350 in conjunction with a Pulsed Eddy Current measurement technique. The minimum remaining wall thickness at the center of the defect is about 60% of nominal. A probe with large magnetic footprint compared to the defect diameter receives a magnetic signal from both the defect and the surrounding nominal thickness, and so cannot provide an accurate measurement of the defect minimum remaining wall thickness. A probe with reduced magnetic footprint is less influenced by the nominal thickness around the defect and provides a more accurate estimation of the defect minimum remaining wall thickness. The curve 370 illustrates the estimated thickness of the object when only the reading of the sensing coils 352 and 354 is used for determining the thickness. The curve 372 illustrates the estimated thickness of the object when only the reading of the sensing coils 302 and 304 is used for determining the thickness. Curve 372 gives a more accurate estimation of the defect minimum remaining wall thickness compared to curve 370. The curve 374 illustrates the estimated thickness of the object when the reading of the sensing coils 302 and 304 and that of the sensing coils 352 and 354 are used for determining the thickness. As illustrated, the sensing coils 352 and 354 provides a lesser accurate estimation of the thinning compared to the sensing coils 302 and 304 due to the larger magnetic footprint. However, the signals detected from both the set of sensing coils 302 and 304 and the set of sensing coils 352 and 354 can be analyzed conjointly to obtain the curve 374. A signal model can be fitted numerically to both signals 370 and 372 to provide a processed measurement 374 that is more accurate than the measurement obtained with the sensing coils 302 and 304 only.

In one embodiment, the sensing coils 302 and 304 are electrically connected to the sensing coils 352 and 354. In another embodiment, the sensing coils 302 and 304 are not electrically connected to the sensing coils 352 and 354. In this case, the set of sensing coils 302 and 304 and the set of claims 352 and 354 may be independently read.

In the following, an exemplary operation method is described for the probe 200, 300, 350 used in conjunction with a pulsed Eddy current (PEC) or transient Eddy current (TEC) NDT method. The exemplary operation method may include a calibration phase and a measurement phase.

In one embodiment, the calibration phase comprises the following steps. The probe 200, 300, 350 is placed with one reference element positioned on a zone of a conductive object with near-nominal wall thickness. The excitation coils 212 and 218 are excited with a current or voltage excitation pulse of controlled duration. The excitation pulse generates a magnetic field that gradually penetrates the object wall thickness. Eddy currents are generated in the conductive object and gradually fade away until a steady state condition is reached. The duration of the pulse is estimated from the nominal object wall thickness so as to be long enough to ensure that the steady state condition is reached. The excitation pulse is shut off rapidly. Decaying Eddy currents and magnetic field are generated in the object under test. The voltage signals generated by the sensing coils or the magnetic sensors are recorded. A signal model is then fitted numerically to the calibration signal and the model parameters representing the near-nominal wall thickness are extracted from the numerical fit.

During the measurement phase, the excitation coils 212 and 218 are excited with an excitation pulse of controlled duration. The duration of the excitation pulse is substantially the same as the one used during the calibration phase. The excitation pulse is shut off rapidly. Decaying Eddy currents and a magnetic field are generated in the object under test. The voltage signals generated by the sensing coils or the magnetic sensors are recorded. A signal model is fitted numerically to each recorded signal. Based on the fit and the calibration data, model parameters representing the wall thickness are extracted.

Figure 7:
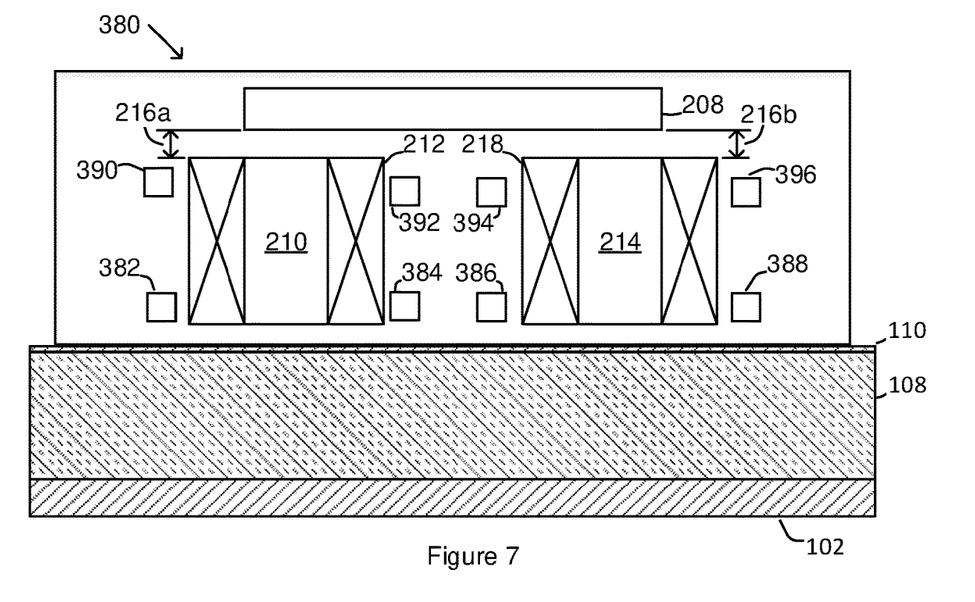
FIG. 7 schematically illustrates an Eddy current probe comprising the components of the probe of FIG. 2, and further comprises eight non-coil magnetic field sensors, in accordance with an embodiment.

While FIGS. 3 and 4 illustrates the probes 300 and 350 which comprise sensing coils for detecting magnetic fields, FIG. 7 illustrates a probe 380 that comprises non-coil magnetic field sensors. The probe 380 corresponds to the probe 200 to which eight non-coil magnetic sensors 382-396 have been added. In this embodiment, the magnetic field sensors 382 and 384 are associated with the excitation coil 212 and they are positioned adjacent to the proximal end of the excitation coil 212 on opposite sides thereof. The magnetic field sensors 390 and 392 are also associated with the excitation coil 212 but they are positioned adjacent to the distal end of the excitation coil 212 on opposite sides thereof.

The magnetic field sensors 386 and 388 are associated with the excitation coil 218 and they are positioned adjacent to the proximal end of the excitation coil 218 on opposite sides thereof. The magnetic field sensors 394 and 396 are also associated with the excitation coil 218 but they are positioned adjacent to the distal end of the excitation coil 218 on opposite sides thereof.

It should be understood that the number of non-coil magnetic field sensors may vary as long as the probe 380 comprises at least one of the magnetic field sensors 382 and 384 and at least one of the magnetic field sensors 386 and 388. For example, the probe 380 may only comprise the magnetic field sensor 382 and the magnetic field sensor 386 or 388. In another example, the probe 380 may only comprise the magnetic field sensor 384 and the magnetic field sensor 386 or 388. In a further example, the magnetic field sensors 384, 386, 392 and 394 may be omitted so that the probe 380 may only comprise the magnetic field sensors 382, 388, 390 and 396.

It should also be understood that the position of the magnetic field sensors 382, 384, 390 and 392 relative to the excitation coil 212 may vary. In one embodiment, the magnetic field sensors 382 and 384 are positioned below the center of mass of the excitation coil 212 while the magnetic field sensors 390 and 392 are positioned above the center of mass of the excitation coil 212. Similarly, the magnetic field sensors 386 and 388 may be positioned below the center of mass of the excitation coil 218 while the magnetic field sensors 394 and 396 are positioned above the center of mass of the excitation coil 218.

While in the illustrated embodiment, the magnetic sensors 382, 384, 386 and 388 are positioned on a plane coplanar with the proximal end of the excitation coil 212, 218, it should be understood that other configurations are possible. For example, the magnetic sensors 382, 384, 386 and 388 may protrude from the plane that comprises the proximal end of the excitation coil 212, 218.

While in the illustrated embodiment, the magnetic sensors 390, 392, 394 and 396 are positioned on a plane coplanar with the distal end of the excitation coil 212, 218, it should be understood that other configurations are possible. For example, the magnetic sensors 390, 392, 394 and 396 may protrude from the plane that comprises the distal end of the excitation coil 212, 218.

In one embodiment, the sensors 382-396 may comprise Giant Magneto-Resistors, Tunneling Magneto-Resistors, Colossal Magneto-Resistors, Anisotropic Magneto-Resistors, Hall effect sensors and/or the like.

Figure 8:
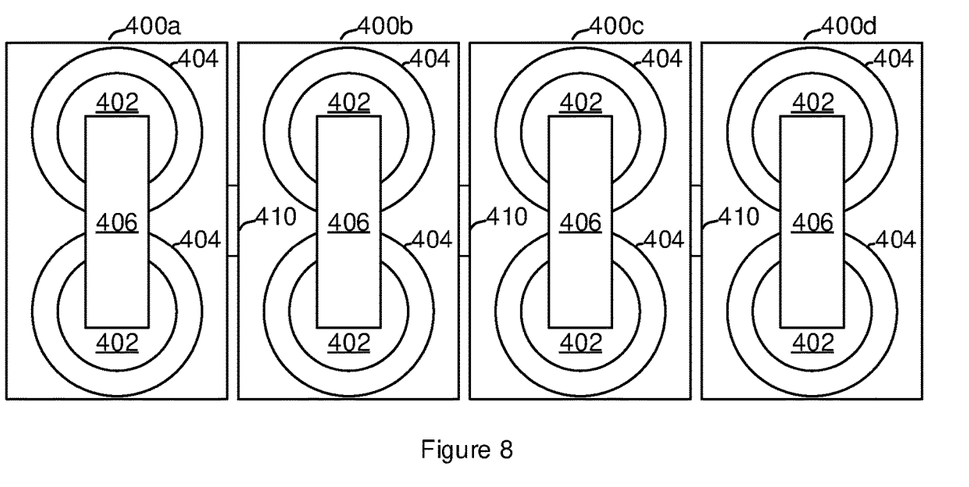
FIG. 8 schematically illustrates an Eddy current probe system comprising four probe units secured together, in accordance with an embodiment.

The present Eddy current probe may be used in a probe system comprising more than one probe such as the probe system illustrated in FIG. 8. This probe system comprises four Eddy current probe units 400a, 400b, 400c and 400d. Each probe unit 400a, 400b, 400c, 400d comprises two core legs 402, two coils 404 each wound a respective core leg 402, and a high magnetic permeability body 406 which are organized in a similar manner as the coils 212, 218, the legs 210 and 214 and the high magnetic permeability body 208 of the probe 200. The probe units 400a, 400b, 400c and 400d may be secured together via a connection device such as a rigid or flexible connection bar 410.

Figure 9:
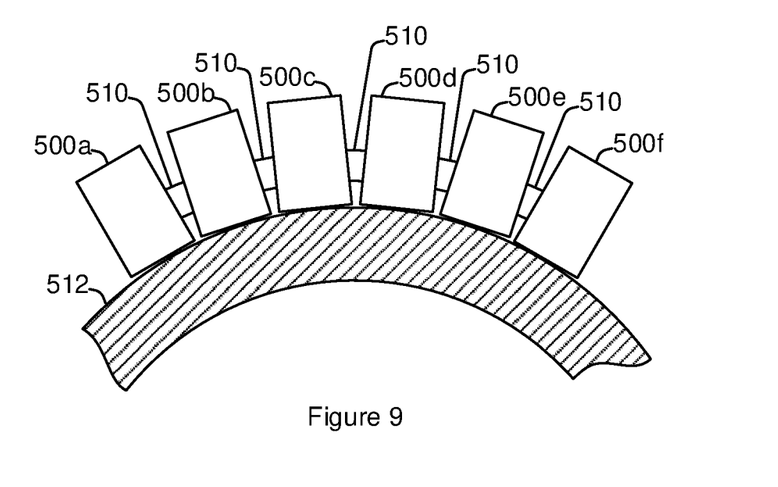
FIG. 9 schematically illustrates an Eddy current probe system comprising six probe units secured together by a flexible or formed bar, in accordance with an embodiment.

FIG. 9 illustrates a probe system comprising six probe units 500a-500f such as six probes 200 or six probes 300 or six probes 350. The probe units 500a-500f are secured together via a flexible or formed bar 510 so that the probe system may follow the curvature of a curved object 512 to be inspected such as a pipe.

In one embodiment, all the array excitation coils present in the probe system are electrically connected in series, while the sensing coils are read independently.

In another embodiment, the excitation coils and reading coils are both fully independent and are not electrically connected together.

A probe system comprising an array of probe units may operate as follows. The operation method of the probe system may comprise a calibration phase and a measurement phase. In the following, an exemplary calibration phase and an exemplary measurement phase are described.

The calibration phase is composed by the following steps. The probe system is placed with one reference element positioned on a zone of a conductive object with near-nominal wall thickness. All the excitation coils in the array are excited simultaneously with a current or voltage excitation pulse of controlled duration. The excitation pulse generates a magnetic field that gradually penetrates the object wall thickness. Eddy currents are generated in the conductive object and gradually fade away until a steady state condition is reached. The duration of the pulse is estimated from the nominal object wall thickness so as to be long enough to ensure that the steady state condition is reached. The excitation pulse is shut off simultaneously in all the excitation coils on the array. Decaying Eddy currents and magnetic field are generated in the object under test. The voltage signals generated by all sensing coils or magnetic sensors are recorded. The signal from the reference element is used as calibration signal. A signal model is then fitted numerically to the calibration signal and the model parameters representing the near-nominal wall thickness are extracted from the numerical fit.

The measurement phase is composed by the following steps. The array is placed on an object under test. All the excitation coils are excited simultaneously with an excitation pulse of controlled duration. The duration of the excitation pulse is the same as the one used during the calibration phase. The excitation pulse is shut off simultaneously in all the excitation coils on the array. Decaying Eddy currents and a magnetic field are generated in the object under test. The voltage signals generated by all sensing coils or magnetic sensors are recorded. A signal model is fitted numerically to each recorded signal. Based on the fit and the calibration data, model parameters representing the wall thickness are extracted.

Figure 10:
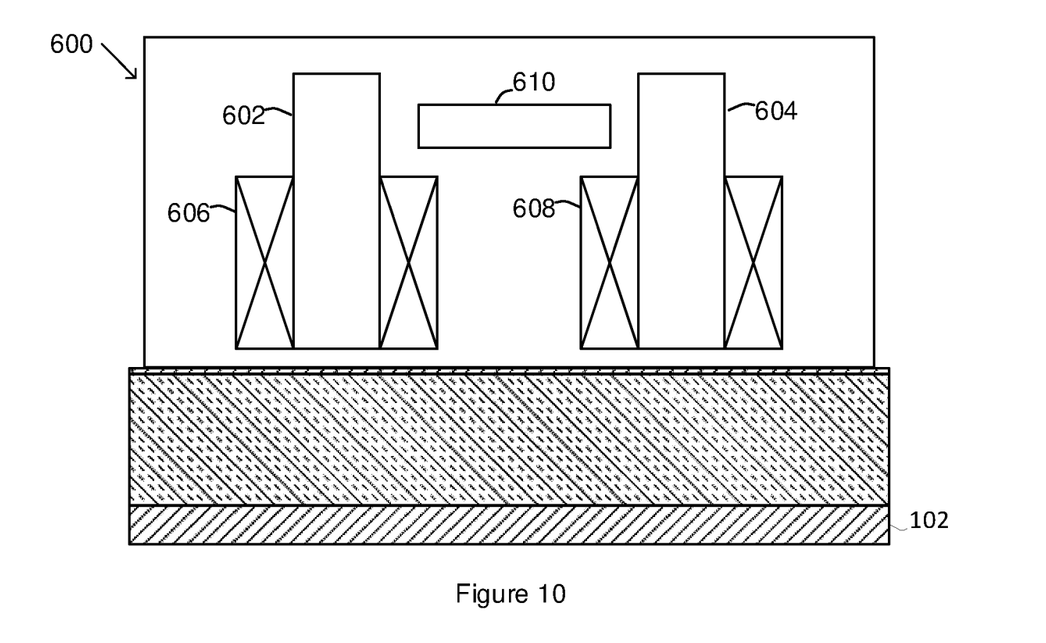
FIG. 10 schematically illustrates an Eddy current probe comprising two core legs around which a respective excitation coil having a length shorter than that of the core legs is wound, and a high magnetic permeability body spaced apart from the two core legs and located between the two core legs, in accordance with an embodiment, FIG. 11 schematically illustrates an Eddy current probe comprising two core legs around which a respective excitation coil having the same length as that of the core legs is wound, and a high magnetic permeability body spaced apart from the two core legs and located between the two excitation coils, in accordance with an embodiment.

While in the probe 200, 300, 350, the coils 212 and 218 have the same length as that of the legs 210 and 214 and the high magnetic permeability body 208 is positioned on top of the legs 210 and 214, i.e. the legs 210 and 214 are positioned between the object to be inspected and the high magnetic permeability body 208, FIG. 10 illustrates an Eddy current probe 600 having a different configuration. The probe 600 comprises two core legs 602 and 604, two excitation coils 606 and 608 and a high magnetic permeability body 610. The excitation coil 606 is wound around only a longitudinal section of the core leg 602 so that the length of the excitation coil 606 is shorter than that of the core leg 602. Similarly, the excitation coil 608 is wound around only a longitudinal section of the core leg 604 so that the length of the excitation coil 608 is shorter than that of the core leg 604. The high magnetic permeability body 610 extends transversally between the core legs 602 and 604 and faces the section of the core leg 602 which is not covered by the excitation coil 606 and the section of the core leg 604 which is not covered by the excitation coil 608. The high magnetic permeability body 610 is spaced apart from the core legs 602 and 604 and the longitudinal axis of the high magnetic permeability body 610 is substantially orthogonal to the longitudinal axes of the core legs 602 and 604.

Figure 11:
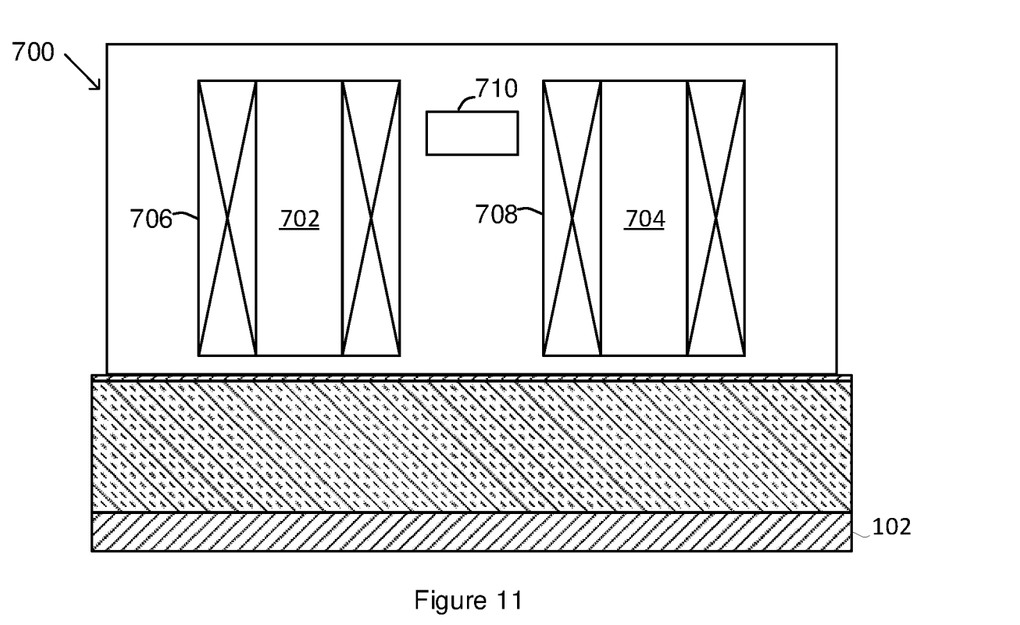

FIG. 11 illustrates one embodiment of an Eddy current probe 700 which comprises two legs 702 and 704, two coils 706 and 708 and a high magnetic permeability body 710. In this embodiment, the coil 706 is wound around the whole length of the leg 702 while the coil 708 is wound around the whole length of the leg 704. The high magnetic permeability body 710 extends transversally between the coils 706 and 708 while being spaced apart from the coils 706 and 708. In this case, the length of the high magnetic permeability body 710 is shorter than that of the high magnetic permeability body 610.

In another embodiment, the probes 600 and 700 may further include sensing coils such as sensing coils 302, 304, 352 and 354.

Figure 12:
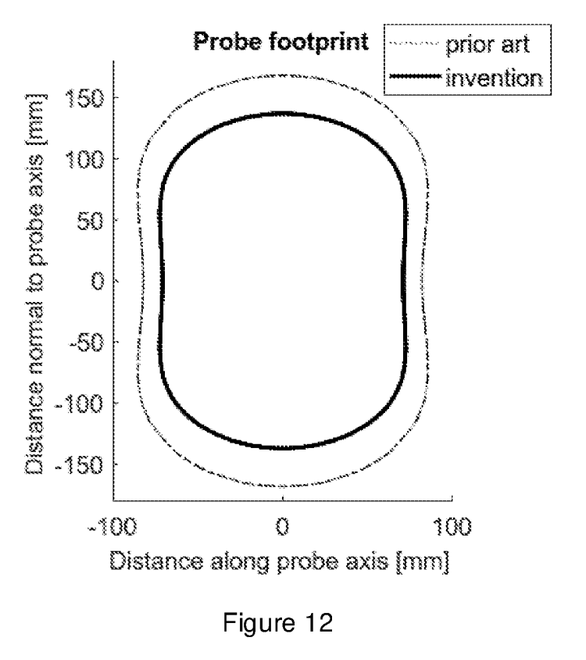
FIG. 12 is an exemplary graph illustrating the magnetic footprint for a prior art Eddy Current probe and the present Eddy current probe.

In the following, experimental or simulation results are presented. FIG. 11 illustrates the magnetic footprint of a probe such as probe 200 and the magnetic footprint of a prior art probe in which two legs are physically connected to a high magnetic permeability body to form a yoke. As illustrated in FIG. 12, the magnetic footprint of the present probe is less than that of the prior art probe.

Figure 13:
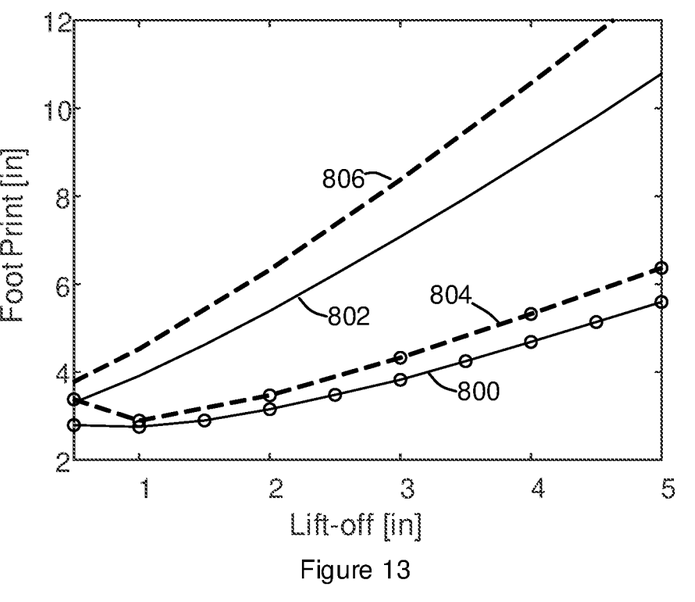
FIG. 13 is an exemplary graph of the magnetic footprint as a function of the lift-off for a prior art Eddy current probe and the present Eddy current probe.

FIG. 13 illustrates the magnetic footprint as a function of the lift-off distance for the present probe and a prior art probe according to two orthogonal direction. The curve 800 represents the magnetic footprint for the present probe along the probe axis as a function of the lift-off while the curve 802 represents the magnetic footprint for the present probe along a direction normal to the probe axis as a function of the lift-off. The curve 804 represents the magnetic footprint for the prior art probe along the probe axis as a function of the lift-off while the curve 806 represents the magnetic footprint for the prior art probe along a direction normal to the probe axis as a function of the lift-off. The person skilled in the art would note that for each direction, the magnetic footprint of the present probe is less than that of the prior art probe for any lift-off distance value.

Figure 14:
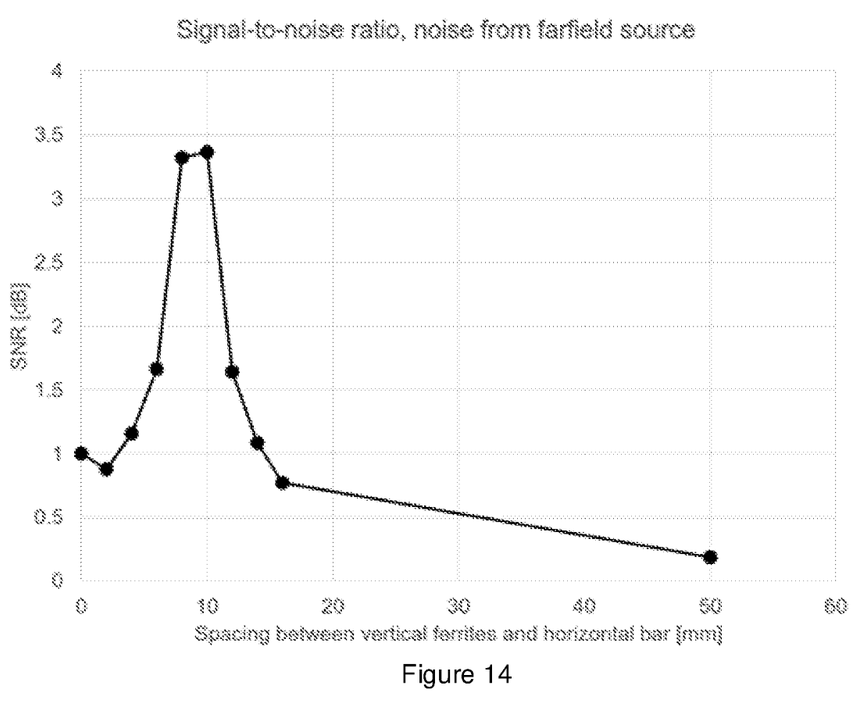
FIG. 14 is an exemplary graph of the signal-to-noise ratio as a function of the length of the gap between the excitation coils and the high magnetic permeability body of an Eddy current probe.

The optimal length of the gap 216a, 216b, i.e. the distance between the high magnetic permeability body 208 and the first and second core legs 210 and 214, is determined experimentally and depends on the desired SNR and the desired magnetic footprint. The amplitude of the electromagnetic noise received by the magnetic sensors is measured as a function of the gap 216a, 216b length in conditions representative of actual probe use. Then the signal amplitude is measured, also as a function of gap 216a, 216b length at a probe-object distance of the maximum supported liftoff. FIG. 14 illustrates the SNR in such conditions as a function of the gap 216a, 216b length. As one can see, the SNR reaches a maximum at about 10 mm. The gap 216a, 216b length is chosen so as to maximize SNR in operating condition while taking into account that the larger the gap 216a, 216b length is, the smaller the probe's magnetic footprint will be. This magnetic footprint is typically measured by scanning over a defect of known dimensions at a controlled liftoff.

The embodiments of the invention described above are intended to be exemplary only. The scope of the invention is therefore intended to be limited solely by the scope of the appended claims.

We claim:

1. An Eddy current probe for non-destructive testing, comprising:
    a first leg extending along a first longitudinal axis between a first proximal end and a first distal end;

a second leg extending along a second longitudinal axis between a second proximal end and a second distal end;

a high magnetic permeability body extending at least partially between the first and second longitudinal axes, the high magnetic permeability body being spaced apart from the first and second legs by a gap and the high magnetic permeability body and the first and second legs being each made of a high magnetic permeability material;

at least one excitation coil each secured to at least one of the first leg and the second leg, wherein a longitudinal axis of the high magnetic permeability body is substantially orthogonal to the first and second longitudinal axes and wherein the gap is filled with one of air and a material having a first magnetic permeability being less than a second magnetic permeability of the high magnetic permeability body;

at least one magnetic field sensor, wherein the at least one magnetic field sensor comprises at least one sensing coil, and wherein each one of the at least one sensing coil is wound around a respective one of the at least one excitation coil.

2. The Eddy current probe of claim 1, wherein the high magnetic permeability body faces the first distal end of the first leg and the second distal end of the second leg and a length of the high magnetic permeability body is at least equal to a distance between the first and second legs.

3. The Eddy current probe of claim 1, wherein the first and second longitudinal axes are parallel.

4. The Eddy current probe of claim 1, wherein at least one of the first leg, the second leg and the high magnetic permeability body has one of a circular cross-sectional shape and a tubular shape.

5. The Eddy current probe of claim 1, wherein the high magnetic permeability body is curved.

6. The Eddy current probe of claim 1, wherein a length of the at least one excitation coil is one of longer than or equal to a length of the at least one of the first leg and the second leg.

7. The Eddy current probe of claim 1, further comprising a casing made of an electrically non-conductive material, the first and second legs, the high magnetic permeability body and the at least one excitation coil being contained within the casing.

8. The Eddy current probe of claim 1, wherein the first and second legs are secured to the high magnetic permeability body via a connection body made of a non-conductive and non-magnetically permeable material.

9. The Eddy current probe of claim 1, wherein a center of mass of each one of the at least one magnetic field sensor is located between a center of mass of a respective one of the at least one excitation coil and a proximal end of the respective one of the at least one excitation coil.

10. The Eddy current probe of claim 9, wherein each one of the at least one magnetic field sensor is adjacent to the proximal end of the respective one of the at least one excitation coil.

11. The Eddy current probe of claim 1, wherein a center of mass of each one of the at least one sensing coil is located between a center of mass of the respective one of the at least one excitation coil and a proximal end of the respective one of the at least one excitation coil.

12. The Eddy current probe of claim 11, wherein each one of the at least one sensing coil is adjacent to the proximal end of the respective one of the at least one excitation coil.

13. The Eddy current probe of claim 12, wherein the at least one sensing coil comprises a first sensing coil and a second sensing coil each around a same one of the at least one excitation coil.

14. The Eddy current probe of claim 13, wherein a center of mass of the first sensing coil is located between a center of mass of the same one of the at least one excitation coil and a first end thereof and a center of mass of the second sensing coil is located between the center of mass of the same one of the at least one excitation coil and a second end thereof.

15. The Eddy current probe of claim 1, wherein the at least one excitation coil comprises a first excitation coil secured to the first leg and a second excitation coil secured to the second leg.

16. The Eddy current probe of claim 15, wherein:

a first detection coil is wound around the first excitation coil, a center of mass of the first detection coil being located between the center of mass of the first excitation coil and the first back end of the first excitation coil; and a second detection coil is wound around the second excitation coil, a center of mass of the second detection coil being located between the center of mass of the second excitation coil and the second back end of the second excitation coil.

* * * * *